United States Patent
Miller et al.

(10) Patent No.: US 10,579,640 B2
(45) Date of Patent: Mar. 3, 2020

(54) MIRRORING RESYNCHRONIZATION

(71) Applicant: International Business Machines Corporation, Armonk, NY (US)

(72) Inventors: Dash D. Miller, St. Louis Park, MN (US); Miguel A. Perez, Miami, FL (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/880,833

(22) Filed: Oct. 12, 2015

(65) Prior Publication Data

US 2017/0103114 A1  Apr. 13, 2017

(51) Int. Cl.
| | | |
|---|---|---|
| *G06F 11/16* | (2006.01) | |
| *G06F 16/27* | (2019.01) | |
| *H04L 29/08* | (2006.01) | |
| *G06F 11/20* | (2006.01) | |
| *G06F 11/30* | (2006.01) | |

(52) U.S. Cl.
CPC ......... *G06F 16/27* (2019.01); *G06F 11/1662* (2013.01); *G06F 11/2094* (2013.01); *H04L 67/1095* (2013.01); *G06F 11/3006* (2013.01); *G06F 2201/81* (2013.01); *G06F 2201/875* (2013.01)

(58) Field of Classification Search
None
See application file for complete search history.

(56) References Cited

U.S. PATENT DOCUMENTS

| | | | |
|---|---|---|---|
| 5,742,792 A * | 4/1998 | Yanai | G06F 3/0601 |
| | | | 710/1 |
| 2001/0010070 A1 | 7/2001 | Crockett et al. | |
| 2005/0160248 A1* | 7/2005 | Yamagami | G06F 3/0619 |
| | | | 711/170 |
| 2007/0028064 A1* | 2/2007 | McBrearty | G06F 11/2082 |
| | | | 711/162 |
| 2007/0162716 A1* | 7/2007 | Yagisawa | G06F 11/1435 |
| | | | 711/162 |
| 2008/0168246 A1 | 7/2008 | Haustein et al. | |
| 2009/0006744 A1* | 1/2009 | Cavallo | G06F 1/3221 |
| | | | 711/114 |
| 2012/0173830 A1* | 7/2012 | Gundy | G06F 11/2064 |
| | | | 711/162 |
| 2014/0280887 A1 | 9/2014 | Kjendal et al. | |

* cited by examiner

*Primary Examiner* — Cheyne D Ly
(74) *Attorney, Agent, or Firm* — Kunzler Bean & Adamson

(57) ABSTRACT

An apparatus, method, system, and program product are disclosed for mirroring resynchronization. In one example, an apparatus includes a mirroring status determination module that detects suspension of mirroring. The apparatus, in a further embodiment, includes a suspension determination module that determines a first change in at least one parameter that resulted in the detected suspension of mirroring. In various embodiment, the apparatus includes a parameter detection module that detects a second change in the at least one parameter that enables resuming minoring. In some embodiments, the parameter detection module detects the first change in the at least one parameter. In one embodiment, the apparatus includes a synchronization module that resumes minoring in response to the parameter detection module detecting the second change.

13 Claims, 4 Drawing Sheets

MIRRORING RESYNCHRONIZATION

FIELD

The subject matter disclosed herein relates to minoring and more particularly relates to minoring resynchronization.

BACKGROUND

Mirroring may be used to duplicate data such that it is stored on both a primary device and a secondary device to aid in disaster recovery.

BRIEF SUMMARY

An apparatus for mirroring resynchronization is disclosed. A method and computer program product also perform the functions of the apparatus. In one embodiment, an apparatus includes a minoring status determination module that detects suspension of mirroring. The apparatus, in a further embodiment, includes a suspension determination module that determines a first change in at least one parameter that resulted in the detected suspension of minoring. In various embodiment, the apparatus includes a parameter detection module that detects a second change in the at least one parameter that enables resuming minoring. In some embodiments, the parameter detection module detects the first change in the at least one parameter. In one embodiment, the apparatus includes a synchronization module that resumes mirroring in response to the parameter detection module detecting the second change. In certain embodiments, at least a portion of the mirroring status determination module, the suspension determination module, the parameter detection module, and the synchronization module includes one or more of hardware and program instructions. The program instructions may be stored on one or more computer readable storage media.

A method for mirroring resynchronization, in one embodiment, includes detecting suspension of mirroring using at least one monitor. The method may also include determining a first change in at least one parameter that resulted in the detected suspension of minoring. In certain embodiments, the first change in the at least one parameter is detected using the at least one monitor. The method may include detecting a second change in the at least one parameter that enables resuming mirroring. In one embodiment, the second change in the at least one parameter is detected using the at least one monitor. The method may also include resuming mirroring in response to detecting the second change.

In one embodiment, a computer program product for minoring resynchronization includes a computer readable storage medium having program instructions embodied therewith. The program instructions, in some embodiments, are executable by a processor to detect suspension of minoring. The program instructions, in one embodiment, are executable by a processor to determine a first change in at least one parameter that resulted in the detected suspension of mirroring. In a further embodiment, the program instructions are executable by a processor to cause the processor to detect a second change in the at least one parameter that enables resuming mirroring. In certain embodiments, the program instructions are executable by a processor to cause the processor to resume minoring in response to detecting the second change.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
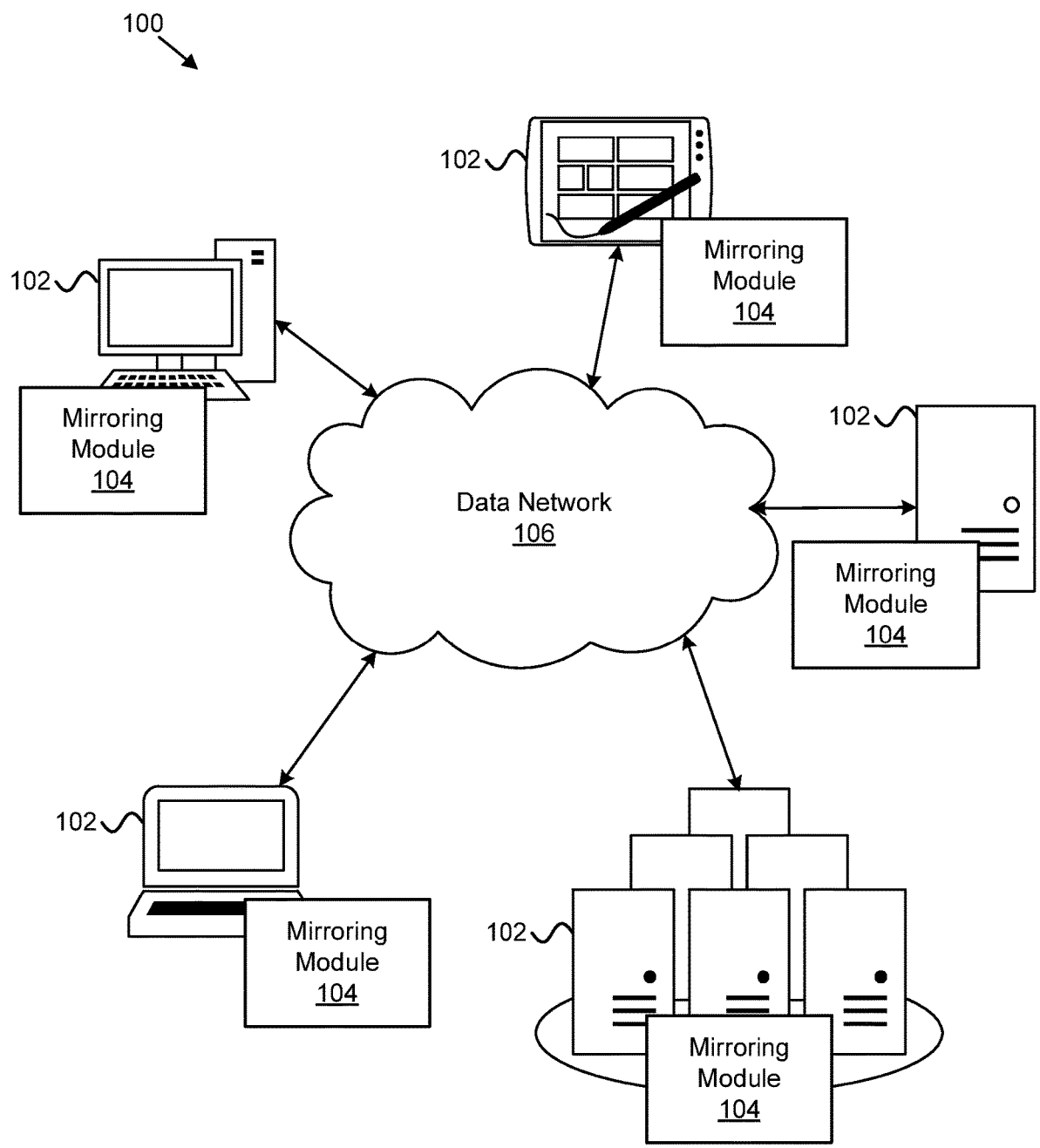
FIG. 1 is a schematic block diagram illustrating one embodiment of a system for mirroring resynchronization in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for minoring resynchronization. In one embodiment, the system 100 includes information handling devices 102, minoring modules 104, and data networks 106. Even though a particular number of information handling devices 102, mirroring modules 104, and data networks 106 are depicted in the system 100 of FIG. 1, one of skill in the art will recognize that any number or configuration of information handling devices 102, mirroring modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, minoring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the mirroring module 104 detects suspension of mirroring using at least one monitor, such as a mirror session monitor, an input/output ("I/O") write activity monitor, a network bandwidth monitor, or the like. The minoring module 104 determines a first change in at least one parameter that resulted in the detected suspension of minoring. In certain embodiments, the first change in the at least one parameter is detected using the at least one monitor. The minoring module 104 may also detect a second change in the at least one parameter that enables resuming minoring. In some embodiments, the second change in the at least one parameter is detected using the at least one monitor. In various embodiments, the at least one parameter includes at least one of an I/O write activity, a network bandwidth, and a mirror session backlog. The mirroring module 104 may resume minoring in response to detecting the second change. In this manner, the minoring module 104 may facilitate minoring resynchronization by resuming minoring without human intervention (e.g., by an information handling device 102 detecting why mirroring is suspended, detecting when conditions are right for resuming minoring, and automatically resuming mirroring). Ultimately, this may facilitate less down time and/or faster recovery from a suspension in mirroring. In certain embodiments, as described below with reference to FIGS. 2 and 3, the mirroring module 104 includes multiple modules that perform the operations of the minoring module 104.

As may be appreciated, the mirroring module 104 may be used in any suitable minoring system 100. For example, the minoring module 104 may be used in a peer to peer remote copy ("PPRC") system, a PPRC extended distance ("PPRC XD") system, an extended remote copy ("XRC") system, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
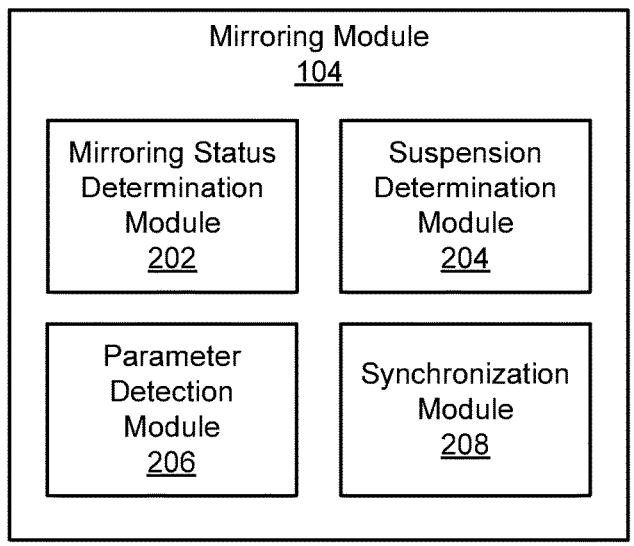
FIG. 2 is a schematic block diagram illustrating one embodiment of a module for minoring resynchronization in accordance with one embodiment of the present invention.

FIG. 2 is a schematic block diagram illustrating one embodiment of a module 200 for minoring resynchronization. In one embodiment, the module 200 includes an embodiment of a minoring module 104. The mirroring module 104, in various embodiment, includes one or more of a mirroring status determination module 202, a suspension determination module 204, a parameter detection module 206, and a synchronization module 208, which are described in more detail below.

In one embodiment, the mirroring status determination module 202 detects suspension of minoring (e.g., halted minoring, stopped minoring, paused minoring, etc.), among other things. For example, the minor status determination module 202 may include a minor session monitor that detects whether each mirror session is minoring or whether the respective mirror session has suspended minoring. In certain embodiment, the minoring status determination module 202 may regularly (e.g., periodically, repeatedly, continuously, at intervals) check to see whether each minor session is minoring or whether the respective minor session has suspended mirroring. For example, the minoring status determination module 202 may regularly check to see whether each minor session is minoring at an interval of 10 milliseconds ("ms"), 100 ms, 1 second ("s"), 10 s, 1 minute, 5 minutes, 10 minutes, 1 hour, and so forth. In certain embodiments, the interval for checking each mirror session may be selectable via user input.

In one embodiment, the mirroring status determination module 202 may check the status of a minor session (e.g., whether the mirror session is mirroring or not mirroring) via a log file, a status indicator, a service, a data file, a status query, and so forth. In certain embodiments, the minor status determination module 202 may be used to perform other tasks besides detecting suspension of monitoring, such as monitoring I/O write activity and/or a network bandwidth.

The suspension determination module 204, in one embodiment, determines a first change in at least one parameter that resulted in the detected suspension of mirroring. The at least one parameter may be any suitable parameter useful for determining why suspension of minoring occurred. For example, the at least one parameter may be one or more of an I/O write activity, a network bandwidth, and a minor session backlog. In one embodiment, suspension of mirroring may occur because of an increase (e.g., spike, large increase) in I/O write activity. The increase in I/O write activity may use an extra amount of system resources so that minoring is suspended in order to keep up with the increase in I/O write activity. In another embodiment, suspension of mirroring may occur because of a decrease in available network bandwidth. The decrease in available network bandwidth may make it unsuitable to continue minoring because mirroring uses a portion of available network bandwidth and such network bandwidth may be desired for other purposes. Accordingly, mirroring may be suspended because of a decrease in available network bandwidth. As may be appreciated, mirroring may be suspended for other suitable reasons based on other parameters.

In some embodiments, the suspension determination module 204 may determine whether the at least one parameter that resulted in the detected suspension of minoring passes (e.g., crosses, exceeds, drops below, increases above, etc.) at least one predetermined threshold. For example, the suspension determination module 204 may determine that an increase in I/O write activity resulted in the detected suspension of minoring because the I/O write activity passed (e.g., increased above) a predetermined threshold for I/O write activity, thereby suspending mirroring. As another example, the suspension determination module 204 may determine that a decrease in available network bandwidth resulted in the detected suspension of minoring because the available network bandwidth passed (e.g., dropped below) a predetermined threshold for available network bandwidth.

The parameter detection module 206, in one embodiment, detects a second change in the at least one parameter that enables resuming minoring. Moreover, in certain embodiments, the parameter detection module 206 also detects the first change in the at least one parameter. Accordingly, the parameter detection module 206 may regularly monitor the one or more parameters to determine when there is a change in the at least one parameter that enables resuming minoring. For example, the parameter detection module 206 may monitor the I/O write activity, the network bandwidth, and/or the mirror session backlog to detect when such parameters are sufficient to enable resuming minoring. In one embodiment, the I/O write activity may need to be below a predetermined threshold and the network bandwidth may need to be above a predetermined threshold for the parameters to be sufficient to enable resuming mirroring. In certain embodiments, the predetermined threshold for the I/O write activity and/or the predetermined threshold for the network bandwidth may be user defined, while in other embodiments, the predetermined threshold for the I/O write activity and/or the predetermined threshold for the network bandwidth may be determined based on historical data, such as historical data from one or more monitors. In some embodiments, the minor session backlog is considered to determine whether monitoring may be resumed. For example, if the mirror session backlog is large, and I/O write activity is near the predetermined threshold, mirroring may not be resumed until the I/O write activity is sufficient so that the minor session backlog may be updated at a certain rate. Furthermore, mirroring may not be resumed until the network bandwidth is sufficient to enable mirror session updates at a certain rate. Accordingly, the second change in the at least one parameter may include changes in multiple parameters.

The synchronization module 208, in one embodiment, resumes minoring in response to the parameter detection module detecting the second change. Accordingly, after the parameter detection module 206 detects the second change in the at least one parameter that enables resuming mirroring, the synchronization module 208 may resume mirroring. The synchronization module 208 may ensure that items on the mirror session backlog are updated to the minor location at a certain rate so that the minoring system gets to its normal operation conditions within a certain period of time. As may be appreciated, each of the minoring status determination module 202, the suspension determination module 204, the parameter detection module 206, and the synchronization module 208 may operation without human intervention so that after mirroring is suspended, the minoring module 104 determines a reason that the mirroring was suspended, determines when it is appropriate to resume minoring, and resumes minoring automatically without any input from a human operator.

In certain embodiments, at least a portion of the minoring status determination module 202, the suspension determination module 204, the parameter detection module 206, and the synchronization module 208 include one or more of hardware and program instructions. In such embodiments, the program instructions may be stored on one or more computer readable storage media.

In one example using XRC, new parameters in SYS1.PARMLIB (e.g., ANTXIN00) may enable a user to turn on a minor network monitor of the mirroring status determination module 202, specify a list of integer codes that indicate success or failure and a list of integer reason codes that indicate a reason for a failure ("RC/RSNs") which are eligible to be resynchronized if they cause suspension of mirroring, and/or specify an interval. When the XRC minor sessions are started (e.g., via XSTART), the processing may ensure that the mirror network monitor task has started if a user has requested that the mirror network monitor task is to be started. The mirror network monitor may regularly (e.g., at intervals, continuously, repeatedly) monitor each mirror session's status after the mirror session has reached duplex.

While monitoring each session's status, the mirror network monitor may determine a network bandwidth threshold and/or I/O write activity threshold (e.g., from 24 hours of previously recorded XRC monitor history data). The mirror network monitor may save the determined network bandwidth threshold and/or the I/O write activity threshold within the XRC monitor history data.

If the session encounters an error that the user specifies is eligible for resynchronization (e.g., RC=0647 RSN=51 specified in ANTXIN00), then the mirror network monitor may query the network and production primary I/O write activity based on a user specified interval. In certain embodiments, new device queries may be imbedded in a direct access storage device ("DASD") subsystem microcode. The mirror network monitor may issue queries for a user specified interval. In this example, the user specified interval may be 30 seconds, yet in other embodiments, the user specified interval may be any suitable time. The DASD subsystem includes LSS readers (e.g., parameter detection module 206) assigned to every suspended XRC session. The LSS readers are used by the query to identify the network bandwidth needed to mirror data. The network bandwidth (measured in Mega bit per second "Mbps") varies considerably within the user specified interval but the network query returns the overall statistical median for that interval. For this example, let's say the network query returned a median of 100 Mbps for the user specified interval of 30 seconds.

In parallel with the network query, the minor network monitor may issue a production I/O write activity query for the same exact user specified interval for every DASD subsystem LSS assigned to the primary devices from the suspended XRC sessions. The I/O write activity varies considerably within that time frame but the I/O write activity query returns the overall statistical median for that interval. For this example, let's say the I/O write activity query returned a median of 5000 Mbps for the user specified interval of 30 seconds.

If the network query is above the network bandwidth threshold and the I/O write query is below the I/O write activity threshold determined by the XRC monitor history data then the mirror network monitor may resynchronize all sessions. As may be appreciated, production I/O write activity threshold may be important because certain users may prefer to suspend minoring rather than pace the production workload. In certain embodiments, pacing is an XRC feature that may impact performance. Using the previous query results as an example, let's say the network threshold was set to 500 Mbps and the I/O write activity threshold was set to 1000 Mbps based on XRC monitor history data. For these thresholds, the minor network monitor would not resynchronize the XRC sessions because the network query returned 100 Mbps which is below the network bandwidth threshold of 500 Mbps, and the I/O write activity query returned 5000 Mbps which is above the I/O write activity threshold of 1000 Mbps. Accordingly, for this example, the mirror network monitor may report the query results and thresholds in the XRC system's SYSLOG activity and then would repeat the two queries for another 30 second interval.

In another example, let's say a different network query returned 600 Mbps and the I/O write activity query returned 800 Mbps. This time the minor network monitor will resynchronize the XRC sessions (e.g., via the synchronization module 208) because the network query returned 600 Mbps which is above the network bandwidth threshold of 500 Mbps, and the I/O write activity query returned 600 Mbps which is below the I/O write activity threshold of 1000 Mbps. Thus, if the total time that the mirroring was not synchronized (e.g., total disaster recovery window, time XRC was suspended) was 1 minute, the mirror network monitor may report such a time and go back to monitoring each XRC session status after they reach duplex.

Figure 3:
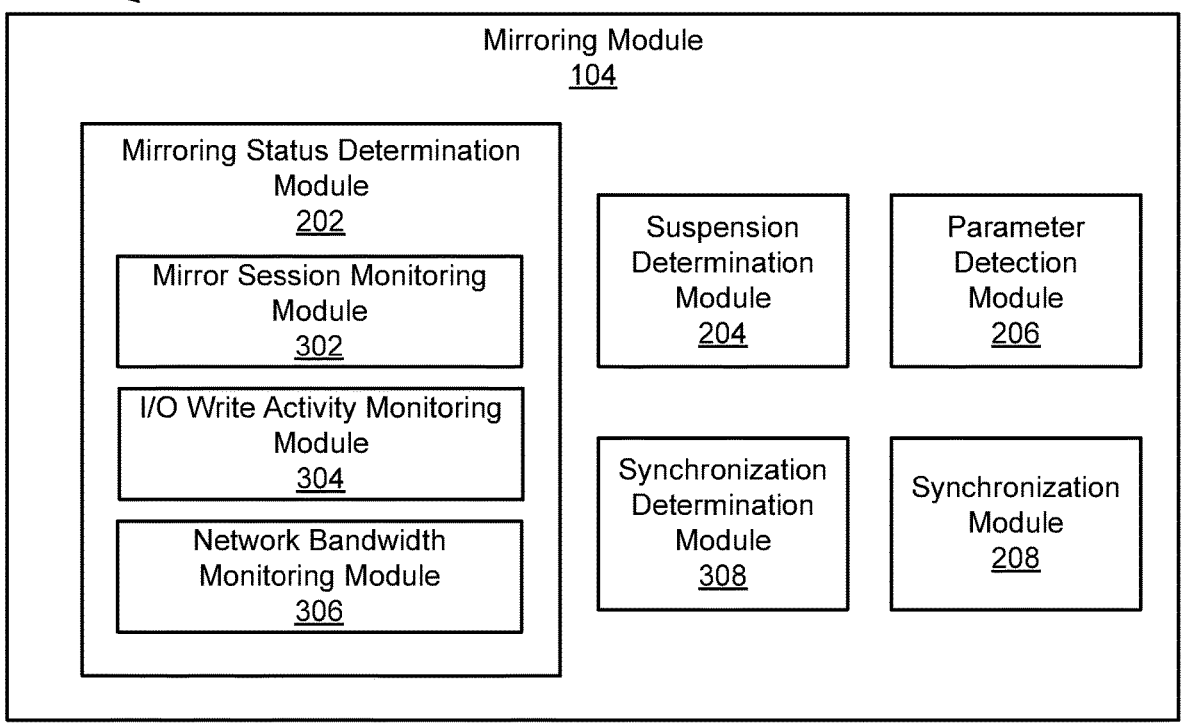
FIG. 3 is a schematic block diagram illustrating one embodiment of another module for minoring resynchronization in accordance with one embodiment of the present invention.

FIG. 3 is a schematic block diagram illustrating one embodiment of another module 300 for minoring resynchronization. In one embodiment, the module 300 includes an embodiment of a minoring module 104. The mirroring module 104, in various embodiments, includes one or more of a minoring status determination module 202, a suspension determination module 204, a parameter detection module 206, and a synchronization module 208, which may be substantially similar to the mirroring status determination module 202, the suspension determination module 204, the parameter detection module 206, and the synchronization module 208 described above. The mirroring module 104 may also include one or more of a mirror session monitoring module 302, an I/O write activity monitoring module 304, a network bandwidth monitoring module 306, and a synchronization determination module 308, which are described in more detail below.

In one embodiment, the minor session monitoring module 302 is used to monitor each mirror session to determine whether a respective mirror session is minoring properly or whether the respective minor session has mirroring suspended. In certain embodiment, the mirror session monitoring module 302 may regularly (e.g., periodically, repeatedly, continuously, at intervals) check to see whether each mirror session is minoring or whether the respective minor session has suspended mirroring. For example, the mirror session monitoring module 302 may regularly check to see whether each mirror session is minoring at an interval of 10 milliseconds ("ms"), 100 ms, 1 second ("s"), 10 s, 1 minute, 5 minutes, 10 minutes, 1 hour, and so forth. In certain embodiments, the interval for checking each mirror session may be selectable via user input. In one embodiment, the mirror session monitoring module 302 may check the status of a mirror session (e.g., whether the mirror session is minoring or not minoring) via a log file, a status indicator, a service, a data file, a status query, a monitor output, and so forth.

The I/O write activity monitoring module 304, in certain embodiments, is used to monitor the I/O write activity. In certain embodiment, the I/O write activity monitoring module 304 may regularly check to see whether the I/O write activity is at, above, or below a predetermined threshold. In certain embodiments, the interval for checking the I/O write activity may be selectable via user input. Moreover, in various embodiments, the predetermined threshold may be selectable via user input. In one embodiment, the I/O write activity monitoring module 304 may check the I/O write activity via a log file, a status indicator, a service, a data file, a status query, a monitor output, and so forth.

In one embodiment, the network bandwidth monitoring module 306 is used to monitor the network bandwidth. In certain embodiment, the network bandwidth monitoring module 306 may regularly check to see whether the network bandwidth is at, above, or below a predetermined threshold. In certain embodiments, the interval for checking the network bandwidth may be selectable via user input. Moreover, in various embodiments, the predetermined threshold may be selectable via user input, while in other embodiments, the predetermined threshold may be determined based on historical data. In one embodiment, the network bandwidth monitoring module 306 may check the network bandwidth via a log file, a status indicator, a service, a data file, a status query, a monitor output, and so forth.

The synchronization determination module 308, in certain embodiments, determines whether to resume mirroring based on at least one of the I/O write activity, the network bandwidth, and the minor session backlog. For example, the synchronization determination module 308 may use the I/O write activity, the network bandwidth, and/or the minor session backlog to determine whether to resume mirroring. In one embodiment, the I/O write activity may need to be below a predetermined threshold and the network bandwidth may need to be above a predetermined threshold to determine to resume minoring. In some embodiments, the mirror session backlog is considered to determine whether monitoring may be resumed. For example, if the minor session backlog is large, and I/O write activity is near the predetermined threshold, mirroring may not be resumed until the I/O write activity is sufficient so that the minor session backlog may be updated at a certain rate. Furthermore, minoring may not be resumed until the network bandwidth is sufficient to enable minor session updates at a certain rate.

Figure 4:
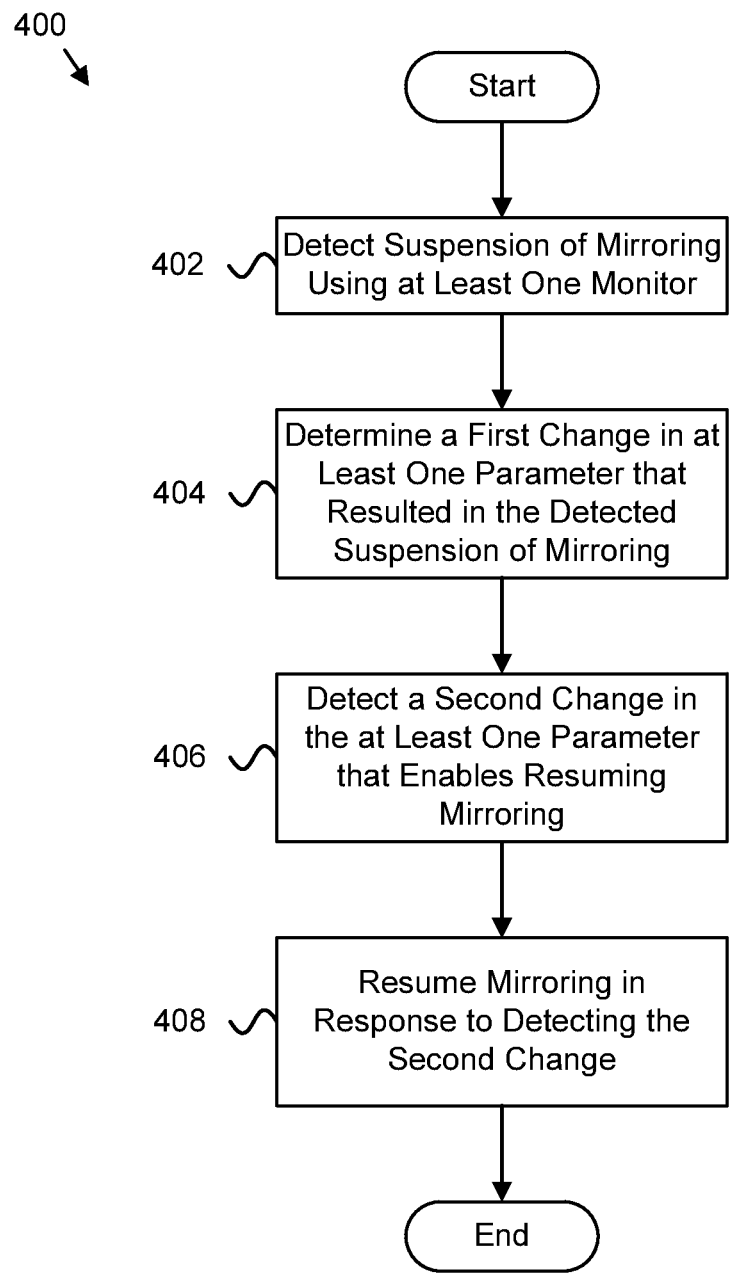
FIG. 4 is a schematic flow chart diagram illustrating one embodiment of a method for minoring resynchronization in accordance with one embodiment of the present invention.

FIG. 4 is a schematic flow chart diagram illustrating one embodiment of a method 400 for mirroring resynchronization. In one embodiment, the method 400 begins and detects 402 suspension of mirroring using at least one monitor. In some embodiments, the minoring status determination module 202 detects 402 suspension of minoring using the at least one monitor. In one embodiment, a minor session monitor detects 402 suspension of minoring using the at least one monitor. In certain embodiments, the at least one monitor may include a mirror session monitor, an I/O write activity monitor, and/or a network bandwidth monitor. The method 400 may determine 404 a first change in at least one parameter that resulted in the detected suspension of minoring. For example, the suspension determination module 204 may determine 404 the first change in the at least one parameter that resulted in the detected suspension of minoring. In some embodiments, the at least one parameter may include an I/O write activity, a network bandwidth, and/or a mirror session backlog. Moreover, the first change in the at least one parameter may be detected using the at least one monitor.

The method 400 may detect 406 a second change in the at least one parameter that enables resuming mirroring. For example, the parameter detection module 206 may detect 406 the second change in the at least one parameter that enables resuming mirroring. Moreover, the second change in the at least one parameter may be detected using the at least one monitor. The method 400 may resume 408 mirroring in response to detecting the second change, and the method 400 may end. In one embodiment, the synchronization module 208 may resume 408 minoring in response to detecting the second change.

In one embodiment, resuming 408 mirroring in response to detecting the second change includes resuming minoring if the detected change indicates that a network bandwidth is above a first predetermined threshold and that an I/O write activity is below a second predetermined threshold. In some embodiments, resuming 408 minoring in response to detecting the second change includes resuming minoring without human intervention.

Figure 5:
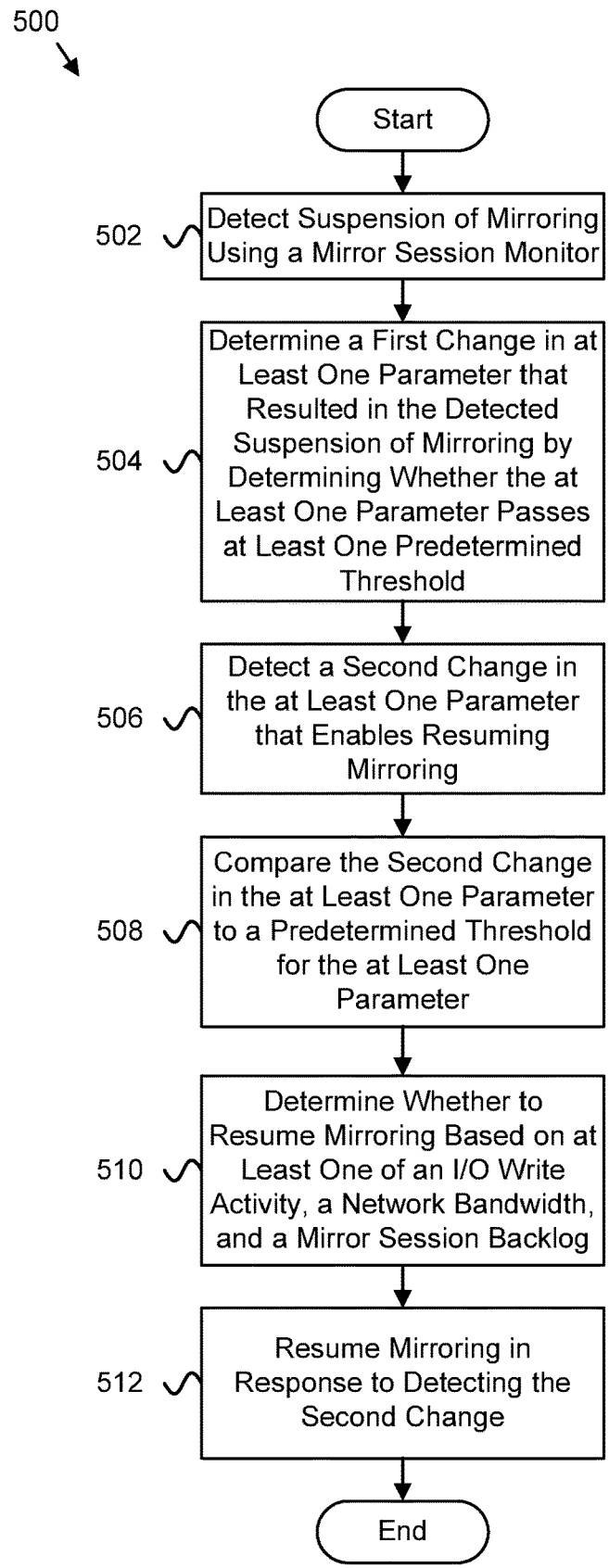
FIG. 5 is a schematic flow chart diagram illustrating one embodiment of another method for mirroring resynchronization in accordance with one embodiment of the present invention.

FIG. 5 is a schematic flow chart diagram illustrating one embodiment of another method 500 for mirroring resynchronization. In one embodiment, the method 500 begins and detects 502 suspension of mirroring using a minor session monitor. In some embodiments, the minoring status determination module 202 detects 502 suspension of minoring using the minor session monitor. The method 500 may determine 504 a first change in at least one parameter that resulted in the detected suspension of minoring by determining whether the at least one parameter passes at least one predetermined threshold. For example, the suspension determination module 204 may determine 504 the first change in at least one parameter that resulted in the detected suspension of minoring by determining whether the at least one parameter passes the at least one predetermined threshold. In some embodiments, the at least one parameter may include an I/O write activity, a network bandwidth, and/or a mirror session backlog. Furthermore, in one embodiment, the at least one predetermined threshold may be user defined, while in another embodiment, the at least one predetermined threshold may be determined based on historical data, such as data from one or more monitors. Moreover, the first change in the at least one parameter may be detected using at least one monitor. In certain embodiments, the at least one monitor may include a minor session monitor, an I/O write activity monitor, and/or a network bandwidth monitor.

The method 500 may detect 506 a second change in the at least one parameter that enables resuming mirroring. For example, the parameter detection module 206 may detect 506 the second change in the at least one parameter that enables resuming mirroring. Moreover, the second change in the at least one parameter may be detected using the at least one monitor. The method 500 may compare 508 the second change in the at least one parameter to a predetermined threshold for the at least one parameter. In certain embodiments, the synchronization determination module 308 may compare 508 the second change in the at least one parameter to the predetermined threshold for the at least one parameter.

The method 500 may determine 510 whether to resume minoring based on at least one of an I/O write activity, a network bandwidth, and a minor session backlog. For example, in certain embodiments, the synchronization determination module 308 may determine 510 whether to resume mirroring based on at least one of the I/O write activity, the network bandwidth, and the minor session backlog. In one embodiment, determining 510 whether to resume minoring based on at least one of the I/O write activity, the network bandwidth, and the mirror session backlog includes determining to resume mirroring if a current I/O write activity, a predicted I/O write activity, a current network bandwidth, and a predicted network bandwidth enable the mirror session backlog and predicted mirror session updates to be completed using available information handling device 102 resources.

The method 500 may resume 512 minoring in response to detecting the second change, and the method 500 may end. In one embodiment, the synchronization module 208 may resume 512 minoring in response to detecting the second change. In one embodiment, resuming 512 mirroring in response to detecting the second change includes resuming minoring if the detected change indicates that a network bandwidth is above a first predetermined threshold and that an I/O write activity is below a second predetermined threshold. In some embodiments, resuming 512 minoring in response to detecting the second change includes resuming minoring without human intervention.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a mirroring status determination module that detects suspension of mirroring;
a suspension determination module that, without human input, determines a first change in at least one parameter that resulted in the detected suspension of mirroring, wherein the at least one parameter comprises at least one of an input/output ("I/O") write activity, a network bandwidth, and a mirror session backlog, the first change comprises a change in at least one of the I/O write activity, the network bandwidth, and the mirror session backlog from a first side of a predetermined threshold to a second side of the predetermined threshold, and the predetermined threshold comprises at least one of a threshold amount of I/O write activity, a threshold available network bandwidth, and a threshold size of the mirror session backlog;
a parameter detection module that, without human input, detects a second change in the at least one parameter that enables resuming mirroring, wherein:
the parameter detection module detects the first change in the at least one parameter;
the parameter detection module detects the second change after detecting the first change;
the second change comprises a change in at least one of the I/O write activity, the network bandwidth, and the mirror session backlog from the second side of the predetermined threshold to the first side of the predetermined threshold; and
detecting the second change comprises transmitting at a predetermined interval a first query to detect the I/O write activity or a second query to detect the network bandwidth; and
a synchronization module that, without human input, resumes mirroring in response to the parameter detection module detecting the second change comprising the change from the second side of the predetermined threshold to the first side of the predetermined threshold;
wherein at least a portion of the mirroring status determination module, the suspension determination module, the parameter detection module, and the synchronization module comprises one or more of hardware and executable code, the executable code being stored on one or more computer readable storage media.

2. The apparatus of claim 1, wherein the mirroring status determination module comprises at least one of a mirror session monitoring module, an I/O write activity monitoring module, and a network bandwidth monitoring module.

3. The apparatus of claim 1, comprising a synchronization determination module that determines whether to resume mirroring based on the at least one of the I/O write activity, the network bandwidth, and the mirror session backlog.

4. A method for mirroring resynchronization, comprising:
detecting suspension of mirroring using at least one monitor;
determining, without human input, a first change in at least one parameter that resulted in the detected suspension of mirroring, wherein the first change in the at least one parameter is detected using the at least one monitor, the at least one parameter comprises at least one of an input/output ("I/O") write activity, a network bandwidth, and a mirror session backlog, the first change comprises a change in at least one of the I/O write activity, the network bandwidth, and the mirror session backlog from a first side of a predetermined threshold to a second side of the predetermined threshold, and the predetermined threshold comprises at least one of a threshold amount of I/O write activity, a threshold available network bandwidth, and a threshold size of the mirror session backlog;
detecting, without human input, a second change in the at least one parameter that enables resuming mirroring, wherein:
the second change in the at least one parameter is detected using the at least one monitor;
the at least one monitor detects the second change after detecting the first change;
the second change comprises a change in at least one of the I/O write activity, the network bandwidth, and the mirror session backlog from the second side of the predetermined threshold to the first side of the predetermined threshold; and
detecting the second change comprises transmitting at a predetermined interval a first query to detect the I/O write activity a second query to detect the network bandwidth; and
resuming, without human input, mirroring in response to detecting the second change comprising the change from the second side of the predetermined threshold to the first side of the predetermined threshold.

5. The method of claim 4, wherein the at least one monitor comprises at least one of a mirror session monitor, an I/O write activity monitor, and a network bandwidth monitor.

6. The method of claim 4, wherein detecting suspension of mirroring using the at least one monitor comprises detecting suspension of mirroring using a mirror session monitor.

7. The method of claim 4, wherein the predetermined threshold is determined based on historical data.

8. The method of claim 4, comprising determining whether to resume mirroring.

9. The method of claim 8, wherein determining whether to resume mirroring comprises determining whether to resume mirroring based on the at least one of the I/O write activity, the network bandwidth, and the mirror session backlog.

10. The method of claim 9, wherein determining whether to resume mirroring based on the I/O write activity, the network bandwidth, and the mirror session backlog comprises determining to resume mirroring if a current I/O write activity, a predicted I/O write activity, a current network bandwidth, and a predicted network bandwidth enable the mirror session backlog and predicted mirror session updates to be completed using available information handling device resources.

11. The method of claim 4, wherein resuming mirroring in response to detecting the second change comprises resuming mirroring without human intervention.

12. A computer program product for mirroring resynchronization, the computer program product comprising a computer readable storage medium having program instructions embodied therewith, the program instructions executable by a processor to cause the processor to:
detect, by processor, suspension of mirroring;
determine, by processor and without human input, a first change in at least one parameter that resulted in the detected suspension of mirroring, wherein the at least one parameter comprises at least one of an input/output ("I/O") write activity, a network bandwidth, and a mirror session backlog, the first change comprises a change in at least one of the I/O write activity, the network bandwidth, and the mirror session backlog from a first side of a predetermined threshold to a second side of the predetermined threshold, and the predetermined threshold comprises at least one of a threshold amount of I/O write activity, a threshold available network bandwidth, and a threshold size of the mirror session backlog;

detect, by processor and without human input, a second change in the at least one parameter that enables resuming mirroring, wherein:

the second change is detected after the first change is detected the second change comprises a change in at least one of the I/O write activity, the network bandwidth, and the mirror session backlog from the second side of the predetermined threshold to the first side of the predetermined threshold; and detecting the second change comprises transmitting at a predetermined interval a first query to detect the I/O write activity or a second query to detect the network bandwidth; and resume, by processor and without human input, mirroring in response to detecting the second change comprising the change from the second side of the predetermined threshold to the first side of the predetermined threshold.

13. The computer program product of claim 12, wherein the program instructions are executable by a processor to cause the processor to determine, by processor, whether to resume mirroring based on the at least one of the I/O write activity, the network bandwidth, and the mirror session backlog.

* * * * *